US009850868B2

(12) United States Patent
Bak

(10) Patent No.: US 9,850,868 B2
(45) Date of Patent: Dec. 26, 2017

(54) INJECTION NOZZLE FOR INJECTING LUBRICATING OIL IN ENGINE CYLINDERS AND USE THEREOF

(71) Applicant: HANS JENSEN LUBRICATORS A/S, Hadsund (DK)

(72) Inventor: Peer Bak, Sæby (DK)

(73) Assignee: HANS JENSEN LUBRICATORS A/S (DK)

( * ) Notice: Subject to any disclaimer, the term of this patent is extended or adjusted under 35 U.S.C. 154(b) by 21 days.

(21) Appl. No.: 14/431,083

(22) PCT Filed: Sep. 24, 2013

(86) PCT No.: PCT/DK2013/050304
§ 371 (c)(1),
(2) Date: Mar. 25, 2015

(87) PCT Pub. No.: WO2014/048438
PCT Pub. Date: Apr. 3, 2014

(65) Prior Publication Data

US 2015/0252765 A1 Sep. 10, 2015

(30) Foreign Application Priority Data

Sep. 25, 2012 (DK) ................................ 2012 70583

(51) Int. Cl.
*F02M 61/14* (2006.01)
*F01M 1/08* (2006.01)
*F02M 59/44* (2006.01)

(52) U.S. Cl.
CPC .............. *F02M 61/14* (2013.01); *F01M 1/08* (2013.01); *F02M 59/44* (2013.01); *F01M 2001/083* (2013.01)

(58) Field of Classification Search
CPC .......... F02M 61/14; F02M 59/44; F01M 1/08; F01M 2001/083
See application file for complete search history.

(56) References Cited

U.S. PATENT DOCUMENTS 4,721,080 A * 1/1988 Moriyasu ................ F02B 23/06 123/256
5,002,025 A * 3/1991 Crouse ..................... F01M 1/08 123/193.4

(Continued)

FOREIGN PATENT DOCUMENTS

GB 610873 A 10/1948
JP 25-3958 11/1925

(Continued)

OTHER PUBLICATIONS

International Search Report; PCT/DK2013/050304; International Filing Date: Sep. 24, 2013; 4 pgs.

(Continued)

*Primary Examiner* — Joseph Dallo
(74) *Attorney, Agent, or Firm* — Schmeiser, Olsen & Watts, LLP

(57) ABSTRACT

An injection nozzle for use in injecting lubricating oil into cylinders in large engines is provided. The nozzle is adapted for fastening in a cylinder wall with a nozzle rod extending through the cylinder wall and with a nozzle outlet at the inner end of the nozzle rod. The nozzle rod includes a cylindrical valve seat boring with a displaceable valve body having a cylindrical sealing face which interacts with the cylindrical valve seat boring of the nozzle rod, the valve body biased by a spring for effective closing of the valve. The valve body is formed by a cylindrical rod having a turned recess in the cylindrical sealing face of the valve body. The turned recess is arranged at the inner end of the (Continued)

valve body with parts of the cylindrical sealing face of the valve body at each side of the turned recess.

13 Claims, 10 Drawing Sheets

(56) References Cited

U.S. PATENT DOCUMENTS

| | | | | |
|---|---|---|---|---|
| 6,547,038 | B1 * | 4/2003 | Thomsen | F01M 1/08<br>123/196 R |
| 6,866,011 | B1 * | 3/2005 | Beardmore | F01M 1/08<br>123/41.35 |
| 6,928,975 | B2 * | 8/2005 | Lauritsen | F01M 1/08<br>123/1 A |
| 7,464,883 | B2 | 12/2008 | Eriksen et al. | |
| 7,681,548 | B2 * | 3/2010 | Aamand | F01M 1/14<br>123/196 M |
| 8,210,317 | B2 * | 7/2012 | Aamand | F01M 1/08<br>123/196 R |
| 8,813,714 | B2 * | 8/2014 | Bak | F01M 1/08<br>123/190.13 |
| 9,121,334 | B2 * | 9/2015 | Honda | F01M 1/08 |
| 2004/0026174 | A1 * | 2/2004 | Lauritsen | F01M 1/08<br>184/6.8 |
| 2006/0130800 | A1 | 6/2006 | Eriksen et al. | |
| 2008/0066712 | A1 * | 3/2008 | Aamand | F01M 1/14<br>123/196 M |
| 2010/0006056 | A1 * | 1/2010 | Aamand | F01M 1/08<br>123/196 R |
| 2010/0162989 | A1 * | 7/2010 | Aamand | F01M 1/08<br>123/196 R |
| 2015/0027388 | A1 * | 1/2015 | Honda | F01M 1/08<br>123/41.35 |

FOREIGN PATENT DOCUMENTS

| | | | |
|---|---|---|---|
| JP | 36-9206 | | 6/1936 |
| JP | S5990765 | U | 6/1984 |
| JP | S60-159883 | | 10/1985 |
| JP | 2003506622 | A | 2/2003 |
| JP | 2003286401 | A | 10/2003 |
| JP | 2007297962 | | 11/2007 |
| WO | 0028194 | A1 | 5/2000 |
| WO | 02/35068 | A1 | 5/2002 |
| WO | 02/35086 | A1 | 5/2002 |
| WO | 02095196 | A1 | 11/2002 |
| WO | 2004/038189 | | 5/2004 |
| WO | 2008009291 | A1 | 1/2008 |
| WO | 2008/071188 | A1 | 6/2008 |

OTHER PUBLICATIONS

Written Opinion; PCT/DK2013/050304; International Filing Date: Sep. 24, 2013; 4 pgs.

* cited by examiner

INJECTION NOZZLE FOR INJECTING LUBRICATING OIL IN ENGINE CYLINDERS AND USE THEREOF

CROSS-REFERENCE TO RELATED APPLICATIONS

This application claims priority to PCT Application No. PCT/DK2013/050304 having a filing date of Sep. 24, 2013, based off of DK PA 2012 70583 having a filing date of Sep. 25, 2012, the entire contents of which are hereby incorporated by reference.

FIELD OF TECHNOLOGY

The following concerns an injection nozzle for use in injecting lubricating oil into cylinders in large engines and adapted with mounting means for fastening in a cylinder wall, with a nozzle rod extending through the cylinder wall and with at least one nozzle outlet at the inner end of the nozzle rod, the nozzle rod including a valve with a cylindrical valve seat boring in which is provided a displaceable valve body having a cylindrical sealing surface which interacts with the cylindrical valve seat boring of the nozzle rod, the valve body having an enlarged head at its outer end with a contact face for a spring disposed around the valve body for establishing a spring-loaded closing of the valve, the nozzle rod including a passage for pressurised oil for supplying pressurised oil to a pressure chamber in which the pressurised oil can exert a force on the valve body so that it is displaced against the action of the spring for opening the valve and establishing an overpressure injection of oil through the nozzle outlet until the oil pressure drops such that the spring establishes an efficient closing of the valve. The following also concerns use of such an injection nozzle.

BACKGROUND

Embodiments of the invention particularly concerns an injection nozzle intended for use in cylinder lubrication of engine cylinders in large diesel engines, particularly marine engines. In such systems, the injection nozzle may include a dosing unit. In such lubricating systems, the injection nozzle has previously been intended for introducing an injection jet in the form of oil mist lubrication. Disclosures of examples of this technique are known e.g. from WO 00/28194, WO 02/35068 and WO 04/038189, which publications are hereby incorporated by reference.

Such an injection nozzle may optionally include a dosing unit or be adapted as an injection nozzle without dosing in the nozzle itself. The term "injection nozzle" thus covers a machine part extending through the cylinder wall and connecting a nozzle outlet or oil injection orifice at an end inside the cylinder with oil connection openings on a part outside the cylinder wall.

Several examples of injection nozzles of the type mentioned in the introduction are known. The injection nozzle is connected with a supply source for oil which is sprayed under pressure into the interior of the cylinder at a given time adapted to the work stroke of a piston in the cylinder.

The injection nozzles are disposed in a number around the circumference of a cylinder. The injection nozzles are usually disposed in radially or largely radially oriented mounting holes in the cylinder wall and extend through this cylinder wall. The injection nozzles are fastened to the cylinder wall via mounting means, e.g. by screw thread on the valve stem itself, or by a mounting bushing screwed into threaded holes formed in the cylinder wall.

The injection nozzles are provided with one or more nozzle outlets that are transversely oriented relative to the nozzle rod and are directed in a direction desired for the actual mounting hole for providing lubrication/flushing with a desired orientation inside the cylinder.

The above mentioned valves have the function that the closing element/valve body moves backwardly against the flow of the introduced oil.

However, injection nozzles where the valve body moves forward with the flow of the incoming oil are known as well. This is an advantage for injection nozzles used for injecting lubricating oil under high pressure, so-called SIP-valves. The advantage appears in that a rising pressure in an injection chamber will not influence the closing capability of the injection nozzle in the same way as in the case of injection nozzles where the needle moves backwards, as the closing action is then a balance between the pressure in the oil and the spring pressure plus the pressure prevailing in the injection space/chamber. By rising pressure in the cylinder there will be a risk that the injection nozzle can leak.

The injection nozzles operating with a forward movement with the flow of oil will have valve bodies with inner borings for conducting the oil to a position close to the nozzle outlet for reducing the dead volume, which is particularly important when injecting small amounts of oil to be atomised at the injecting action.

Former injection nozzles are therefore complicated due to the formation of internal ducts.

Moreover, the former injection nozzles are disadvantageous as there may be a blocking of the free movement of the valve body. This problem is particularly seen in connection with injection nozzles where the valve body moves backwards against the oil flow, though occurring in the prior are injection nozzles as well where the valve body moves forward with the flow of the supplied oil. The problem with free movement is caused by the fact that the lubricating oil can contain relatively large particles which are e.g. introduced in the lubricating oil in connection with production/storage/transport of the lubricating oil. These particles have sizes in the magnitude of 6-10 μm. In the former injection nozzles, these particles can be deposited between the valve body and the guide for the valve body, thereby preventing free movement of the valve body.

Examples of injection nozzles for fuel injection by which the valve body moves forward with the flow of oil are known e.g. from GB 610,873 and JP 59-90765.

The difference between injection nozzles for cylinder lubrication and for fuel injection is mainly that pressure, viscosity and dosing amounts differ significantly. An injection nozzle for cylinder lubrication will thus—compared with injection nozzles for fuel injection—deliver substantially lesser amounts at a substantially lower pressure combined with fact that the oil has a markedly higher viscosity. These conditions are to be transferred to a design which is simple and robust.

In practice when working with valve bodies in the form of needles in needle valves, it can be difficult to filter off particles in the lubricating oil with a size down to the typical gap dimension used in needle valves, namely 8-10 μm or less. Typically, central filters are used for the entire lubricating system as local cylinder filters will be difficult to mount and maintain. Typically, there is no problem with filtrating the oil locally or centrally with a filter filtering off particles larger than 0.01 mm. In practice, the experience is typically that a central filter with a mesh size of 0.025 mm or larger can be applied. Such a filtration is sufficient to ensure that clogging of the nozzle outlets in the individual injection nozzles does not occur. In order to prevent possible contaminated oil from blocking or jamming in the gap between the valve body and the valve body guide, a large gap is needed. However, this puts demands on the valve body as larger gaps will make such a valve body unsuitable in use.

Injection nozzles according to embodiments of the present invention can be used for injecting cylinder lubricating oil as a compact jet or by an atomisation of the injected oil. The injection nozzle will typically be adapted for operating at a pressure between 25 and 70 bar, typically at 40 bar or above. As mentioned above, the pressure at injectors for fuel are substantially higher—typically 500-1000 bar.

It is also desired that systems for oil injection can be made with a more simple piping between lubricating apparatus and injection nozzles. This may, e.g. occur by coupling the injection nozzles in series. However, traditional injection nozzles are not suited for such an arrangement.

On traditional injection nozzles, the pressurised oil act on a relatively small annular area, and at the same time relatively long valve guides are used with a small gap up to 0.01 mm. To this is added that the quality of the valve seat with regard to width and surface greatly affects the forces applied on the valve needle at given pressure conditions. This means that crack-pressure can be very uneven. Crack-pressure indicates the pressure at which the valve body begins to move, and the crack-pressure will primarily depend on friction and adherence between valve body and valve housing.

In the former injection nozzles, this means that the force and thereby the pressure required for lifting valve bodies can vary much among individual injection nozzles, and over time for one injection nozzle as well. This has entailed that former injection nozzles have not been suited for coupling in series.

SUMMARY

An aspect relates to an injection nozzle of the type mentioned in the introduction, which has a simple technical design with a blockage of the oil supply to the nozzle outlets, ensuring a small dead volume, and which is resistant to blocking of the movement of the valve body. Furthermore, it is desired to indicate an injection nozzle without a valve seat such that the function of the injection nozzle cannot be influenced by damaged/worn valve seats. Finally, it is also desired to indicate a use in a system with connection in series of the injection nozzles.

According to embodiments of the present invention, this is achieved by an injection nozzle of the type mentioned in the introduction which is peculiar in that the valve body is formed by a cylindrical rod which has a turned recess in the cylindrical sealing face of the valve body, that the turned recess is arranged at the inner end of the valve body, with parts of the cylindrical sealing face of the valve body at each their side of the turned recess, for being connected with the nozzle outlet at the forward displacement of the valve body against the action of the spring, that the pressure chamber of the nozzle rod is formed by a pressure chamber boring with greater diameter than the valve seat boring for forming a pressure chamber in which the spring is located, and that the pressure chamber via a pressurised oil supply duct is connected with the turned recess in the valve body.

In the present description the term "turned recess" is used for an annular valve body cutout, but it is not necessarily a recess produced by chip removal by turning. The cutout can be formed in the valve body in other ways, for example by making the valve body of several part elements with varying cross-sections.

As the valve body is formed by a cylindrical rod, a tight fit for the valve seat boring is achieved in a simple way, allowing that the valve body can slide back and forth by the action of the force from oil pressure and the force from the spring, respectively. Together with the valve seat boring the turned recess in the valve body forms an annular chamber.

The pressure chamber is formed by a boring which larger than the valve seat boring such that the valve body and the spring provided around it are contained in the pressure chamber. Pressurised oil supplied from a reservoir or pump will thus have a large chamber in which pressure is built up within the injection nozzle. Before start-up, the spring will hold the valve body against a stop. In this stop there is no need for a valve seat interacting with a sealing face on the valve body in order to prevent oil from penetrating into the pressure chamber as sealing of the injection nozzle is established via the cylindrical faces on the valve body and the valve seat boring. When a sufficiently large pressure has been formed at start-up for surmounting the force from the spring, which is retained against a stop, the valve body will be displaced forward. The pressure chamber will hereby be filled with lubricating oil, and the pressurised oil supply duct will open. During operation, the pressure chamber will be filled with oil and will thus only need to be filled at start-up.

As the pressure oil supply duct connects the pressure chamber with the turned recess at the inner end of the valve body, the oil will be conducted to an annular chamber which is displaced in the valve seat boring. The turned recess can be made with a bottom and two sidewalls, other edged shapes or have a rounded shape. It is essential that there is a well-defined front edge between the turned recess and the cylindrical sealing face of the valve body. When the front edge of the turned recess is brought into contact with one or more nozzle outlets provided in the wall of the nozzle rod at the inner end of the nozzle rod, the pressurised oil can be injected directly through the nozzle outlet. Therefore no dead volume appears between the pressurised oil in the annular chamber formed by the turned recess and the nozzle outlet, except for the small amount of oil possibly present in the boring through the wall of the nozzle rod connecting the chamber formed by the turned recess with the mouth of the nozzle outlet in the cylinder. When the injection nozzle activates injection, a maximum pressure will thus prevail even from the beginning of the oil injection.

When the dosed lubricating oil is supplied out through the nozzle outlet or outlets, the pressure across the valve body drops. When the pressure becomes so low that the spring no longer can hold the valve body back, the valve body will be moved back by the spring force so that the nozzle outlet is blocked again by the part of the cylindrical sealing face of the valve body which is located in front of the turned recess such that the nozzle outlet is no longer in contact with the turned recess. The valve body will be moved back against the stop by the spring acting on the contact face of the enlarged head. There is no need here or the valve body to be moved right up to bear against the stop as a dynamic balance between the forces from the spring and the oil pressure can arise during operation such that the valve body is just displaced back and forth for alternately bringing the turned recess into contact with the nozzle outlet and breaking this contact.

By resumption of the supply of pressurised oil to the pressure chamber, a force is exerted on the valve body such that it is displaced forwards while at the same time pressurised oil flows past the head of the valve body and into the chamber in which the spring is located, around the valve body and into the pressurised oil supply duct and on to the annular chamber formed by the turned recess.

A new oil injection can then take place as described above.

The oil supply duct can be formed in various ways.

According to a first embodiment, the injection nozzle is peculiar in that the valve body has at least one bevelled side for forming the pressurised oil supply duct together with the valve seat boring.

According to a further embodiment, the injection nozzle is peculiar in that the nozzle rod has a least one boring connecting the pressure chamber with the turned recess. The pressurised oil supply duct is hereby formed in the wall of the nozzle rod.

According to a further embodiment, the injection nozzle is peculiar in that the nozzle rod has a least one longitudinal groove in the cylindrical valve seat boring connecting the pressure chamber with the turned recess.

The lubricating oil for the injection nozzle can be delivered by a lubricating apparatus, e.g. of the type described in WO 02/095196 or WO 2008/009291, the contents of which are hereby incorporated by reference. The lubricating oil for the injection nozzle is delivered via unions or similar which are connected with the pressurised oil passage ensuring supply of oil to the pressure chamber where the oil applies its force on the valve body for opening the valve and injecting lubricating oil when the spring force has been surmounted.

By an injection nozzle wherein the oil supply duct for pressurised oil is formed between bevelled side on the valve body and the valve seat boring, there is achieved a more simple design than by designs provided with internal borings in the valve body. Furthermore, conducting oil in a thus formed supply duct will not provide any risk as to blocking the free mobility of the valve body in the valve body boring. The same advantages are achieved by the other ways of making the oil supply duct.

In a particular embodiment of the invention, the stop will be an annular element having a central opening for the flow of oil. The annular element will constitute a stop for the travel of the valve body under the action of the spring if operating with an oil pressure that result in a force which is less than the force by which the spring is preloaded. Depending on the length of the stop, the preloading of the spring will vary and thereby also the pressure occurring between deliveries from the injection nozzle. In this way the pressure in the oil can be varied, causing i.a. change in form and density of the delivered oil when it leaves the nozzle outlet in the injection nozzle. Higher pressure will typically provide a better/finer atomisation of the lubricating oil. It is preferred that this stop is provided with a screw thread such that it can screwed into the nozzle rod with an adjustable position.

By embodiments of the invention the terms "inner" and "outer" end are used. This refers to the end of the nozzle rod and the valve body, respectively, situated closest to the interior of the cylinder to be lubricated, whereas outer refers to the end of the cylinder rod and the valve body, respectively, situated farthest from the interior of the cylinder to be lubricated. By the term "forward" is referred to the displacement of the valve body towards the interior of the cylinder.

According to a further embodiment, the injection nozzle is peculiar in that the nozzle rod also includes a return oil passage for draining off possible leak oil. When the injection nozzle is closed at its inner end, a cavity will appear between the valve rod and the innermost end of the valve body. It will be necessary to ventilate this cavity such that excessive oil can be conducted back to the lubricating apparatus or an oil reservoir via a return pipe. Such a venting of the cavity in front of the valve element may preferably be provided by cutting through the valve element.

According to a further embodiment, the injection nozzle is peculiar in that the valve seat boring is open at the end such that possible leak oil can be drained off via the open end. In this embodiment, the open end of the injection nozzle will open into the interior of the cylinder. In this way, possible leak oil will not have to be returned. The leak oil can be drained into the cylinder and then contribute to lubrication of the cylinder. This embodiment is particularly advantageous as the injection nozzle can be made without needing a return pipe. This provides a simpler technical design with fewer parts and more uncomplicated machining than by the closed injection nozzle.

According to a further embodiment, the injection nozzle is peculiar in that the valve body has two opposing bevelled sides. By this embodiment, two separate pressurised oil supply ducts are formed along the valve body. A very rapid and uniform distribution of the oil in the chamber formed by the turned recess may hereby be achieved. Alternatively, the valve body can be provided with a plurality of bevelled sides.

According to a further embodiment, the injection nozzle is peculiar in that the bevelled sides of the valve body extend into the valve chamber in which the spring is located. By this embodiment is ensured that the pressurised oil supply duct formed by the bevelled sides is provided a certain communication with the chamber in which the spring is located such that the pressurised oil can be conducted with certainty through the spring chamber and into the ducts along the valve body.

According to a further embodiment, the injection nozzle is peculiar in that the contact face of the valve body is planar or spherical. The contact face of the valve body can have different shapes. However, it is preferred that the contact face is planar or spherical and interacts with a corresponding valve seat. By the said shapes of the contact face and the valve seat, the risk of blocking will be minimal such that the operational reliability of the injection nozzle is optimal.

According to a further embodiment, the injection nozzle is peculiar in that a stop for limiting the displacement of the valve body is provided. By providing a stop for limiting the displacement of the valve body, it will be possible to perform a more exact setting of the dosing delivered by each injection. There may be provided a stop for limiting the displacement of the valve body forward by action of the oil pressure as well as there may be provided a stop for limiting the rearward displacement of the valve body by action of the spring force.

According to a further embodiment, the injection nozzle is peculiar in that a nut for preloading the spring is provided. By enabling variable preloading of the spring it will be possible to adapt the injection nozzle to different opening pressures. Hereby it will be possible to achieve a precise controlling of the oil injection pressure at which the injection nozzle is operating.

According to a further embodiment, the injection nozzle is peculiar in that a plurality of nozzle outlets are provided, preferably disposed with varying orientation relative to a centre axis through the nozzle rod. By providing the injection nozzle with several, differently oriented nozzle outlets, it will be possible to inject the lubricating oil such that it will be more evenly distributed and cover an annular area on the cylinder wall as well as it will be possible to adjust the height of this annular area.

According to a further embodiment, the injection nozzle is peculiar in that the nozzle outlets have different shapes. By varying the shape of the nozzle outlets it is possible to regulate the extent of the oil on the cylinder wall. It is thus possible to operate with larger or lesser nozzle outlets such that it hereby becomes possible to influence the distance between the nozzle mouth and the area on the cylinder wall hit by the injected oil.

According to a further aspect of the embodiments of the invention there is described a use of an injection nozzle according to embodiments of the invention in a system for use in injecting lubricating oil into cylinders in large engines, and arranged with injection nozzles which are mounted in a cylinder wall, a lubricating apparatus with at least one pumping unit, connecting tubes for connecting the lubricating apparatus with the injection nozzles. This use is peculiar in that the injection nozzles are coupled in series and supplied with lubricating oil from one pump unit.

This system is possible as the design of the injection nozzles will ensure a more uniform distribution of lubricating oil when a dosing source in the form of a pump unit is coupled to a plurality of injection nozzles. This is due to the fact that the supply pressure in the lubricating oil affects the core area such that the force moving the valve body forward is considerably larger (compared with a traditional injection nozzle with a guide and a valve seat). Hereby simultaneous movement of the valve bodies in the serially coupled injection nozzles is ensured.

By coupling the injection nozzles in series and let them be supplied by the same pump unit in a lubricating apparatus, the piping can be considerably simplified.

By an injection nozzle according to embodiments of the invention, the force—and thereby the pressure—needed for lifting all valve bodies will be very uniform due to the small dead volume and a design without any valve seat and valve guide. Conclusively, the advantages of embodiments of the present invention can be said to include:

simplified design of injection nozzle;
simplified requirements for maintenance;
a robust and flexible injection nozzle;
more uniform atomisation;
more uniform crack-pressure between individual injection nozzles, which by serially coupling of several injection nozzles to a dosing source results in a more uniform dosage among the individual injection nozzles;
possibility of optimising injection pressure;
possibility of individual adjustment of injection nozzles when using a plurality of injection nozzles by using individual stops in the individual injection nozzles in a system;
elimination of dead volume between nozzle outlet and closing element of the injection nozzle, minimal risk of blocking the free movement of the valve body; and
elimination of a typical wearing component for spray/jet injectors as the injection nozzle does not have a valve seat that can be worn or damaged.

BRIEF DESCRIPTION

Some of the embodiments will be described in detail, with reference to the following figures, wherein like designations denote like members, wherein.

DETAILED DESCRIPTION

Figure 1:
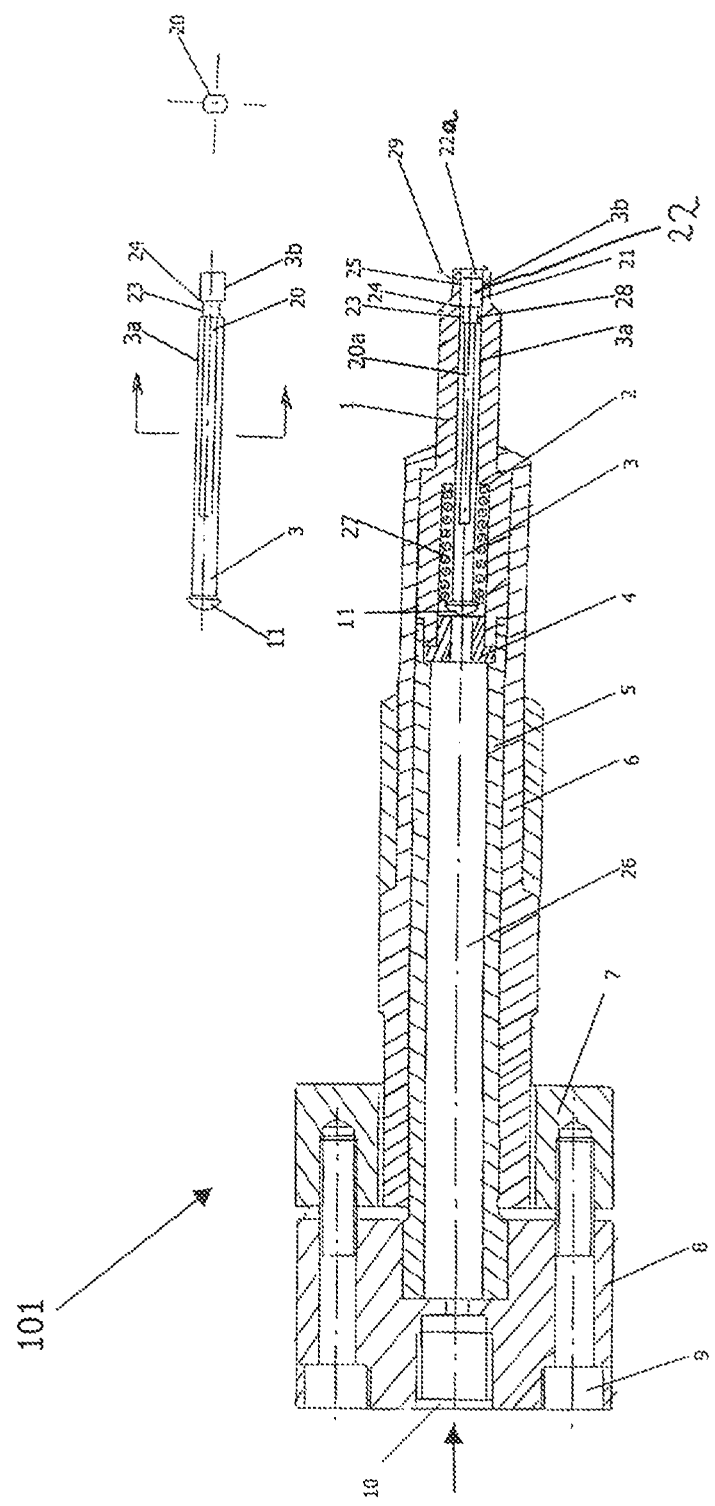
FIG. 1 illustrates a first embodiment of an injection nozzle according to the invention, including a nozzle rod with a valve seat boring and a valve body displaceable therein, and where lubricating oil is conducted to a turned recess in the valve body via ducts formed by bevelled sides on the valve body, and where possible leak oil is conducted into the cylinder.

FIG. 1 shows an embodiment of the injection nozzle where possible leak oil is conducted into the cylinder. The injection nozzle includes a nozzle rod divided into an inner part 1 which contains a valve body 3 and an outer part extending through a cylinder wall 102 (see FIG. 11) and formed by an inner tube 5 and an outer tube 6. Alternatively, the nozzle rod can be made in one piece.

On FIG. 1 the following components are seen:

101—injection nozzle
1—nozzle rod
2—spring
3—valve body
3*a*, 3*b*—cylindrical sealing face on valve body
4—stop for valve body
4*a*—passage through stop 4
5—inner tube
6—outer tube
7—mounting flange
8—oil supply flange
9—screws for fastening oil supply flange
10—threaded hole for oil supply union
11—head of valve body 3
20—bevelled sides of valve body for forming a pressurised oil supply duct
21—valve seat boring interacting with valve body sealing faces 3*a*, 3*b*
20*a*—pressurised oil supply ducts formed by bevelled sides 20 and the valve seat boring 21
22—cavity for innermost end of reciprocating valve body
22*a*—opening from cavity into cylinder
23—turned recess for oil supply
24—edge/transition between sealing face and turned recess
25—nozzle outlet
26—duct for supplying lubricating oil to pressure chamber
27—pressure chamber

28—annular chamber formed by turned recess 23 and valve seat boring 21

29—one or more spray(s)/jet(s) (through one or more nozzle outlets)

The injection nozzle 101 operates in that a dose of pressurised lubricating oil is delivered through the union 10 and on down in the duct 26 and the pressure chamber 27. A pressure build-up occurs in the duct 26 and in the pressure chamber 27 as the valve seat boring 21 acts as a sealing face interacting with the sealing faces 3*a* and 3*b* of the valve body. Displacement of the valve body 3 only takes place when the pressure in the lubricating oil exerts a force which is large enough to overcome the force from the spring 2. The head 11 will hereby leave the stop 4 such that the oil flows into the pressure chamber 27. The oil also flows through the pressurised oil supply ducts 20*a*.

The interaction between the sealing faces and the valve seat boring ensures that the pressurised oil can only be delivered out through the nozzle outlet 25 when the valve body 3 is pressed so far to the right in FIG. 1 that the front edge 24 of the turned recess 23 passes the nozzle outlet 25 so that communication is formed between the annular chamber 28 and the nozzle outlet 25.

After the first filling of the duct 26, the pressure chamber 27 and the pressurised oil supply duct 20*a* with oil, there are established pressure conditions so that the head 11 is not moved so far back as to establish contact against the stop between successive oil injections.

Figure 2:
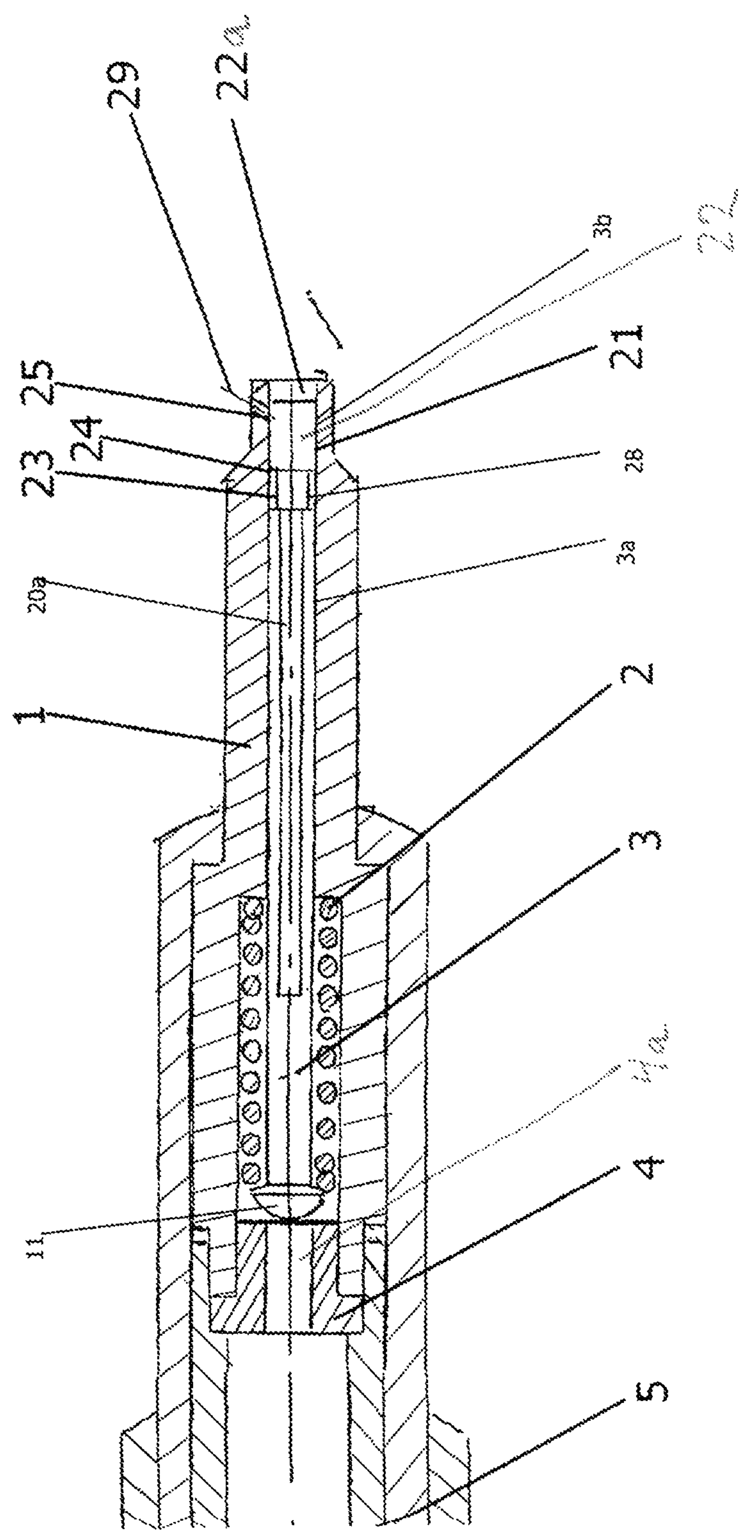
FIG. 2 is a detail of the injection nozzle shown in FIG. 1, where focus is on the front part of the injection nozzle.

FIG. 2 shows the foremost part of the injection nozzle 101 shown in FIG. 1. In this embodiment, possible leak oil will be conducted into the cylinder itself as pressurised lubricating oil possibly passing by the sealing face 3*b* and into the cavity 22 will flow out of the opening 22*a*.

The function is as follows:

a) Pressurised lubricating oil is conducted to the duct 26 via the union 10.

b) The lubricating oil is conducted through the passage 4*a* in the stop 4 and into the pressure chamber 27 past the spring 2. The pressurised oil is conducted via the two pressurised oil supply ducts 20*a* down to the annular chamber 28.

c) The pressurised oil acts on the active area of the valve body 3 which is the difference between the largest area of the valve body minus the core area of the valve body. The core area is defined by the diameter of the turned recess 23.

d) When the force exerted by the pressure in the lubricating oil is sufficiently large to surmount the force from the spring 2, the valve body 3 is pressed to the right.

e) When the valve body 3 is displaced sufficiently to the right such that the front edge 24 of the turned recess 23 is aligned with the nozzle outlet 25, the pressurised oil can be delivered freely through the nozzle outlet. No dead volume will appear between the annular chamber and the nozzle outlet. The pressure in the annular chamber 28 will thus be maintained in the lubricating oil when the latter is delivered through the nozzle outlet 25.

The injection nozzle is typically supplied with oil at a pressure of 30-70 bar which is also the pressure at which the valve is opened. The opening pressure of this injection nozzle is determined by the compression of the spring 2. By this embodiment, this compression of the spring 2 is not adjustable but is given by the spring characteristic and the geometry of the stop 4 and the nozzle rod 1. These two determine how great force is needed for the spring 2 to be compressed enough in order to open for passage of the lubricating oil from the annular chamber 28 to the nozzle outlet 25.

Each injection nozzle 101 can have two or more nozzle outlets 25.

Figure 3:
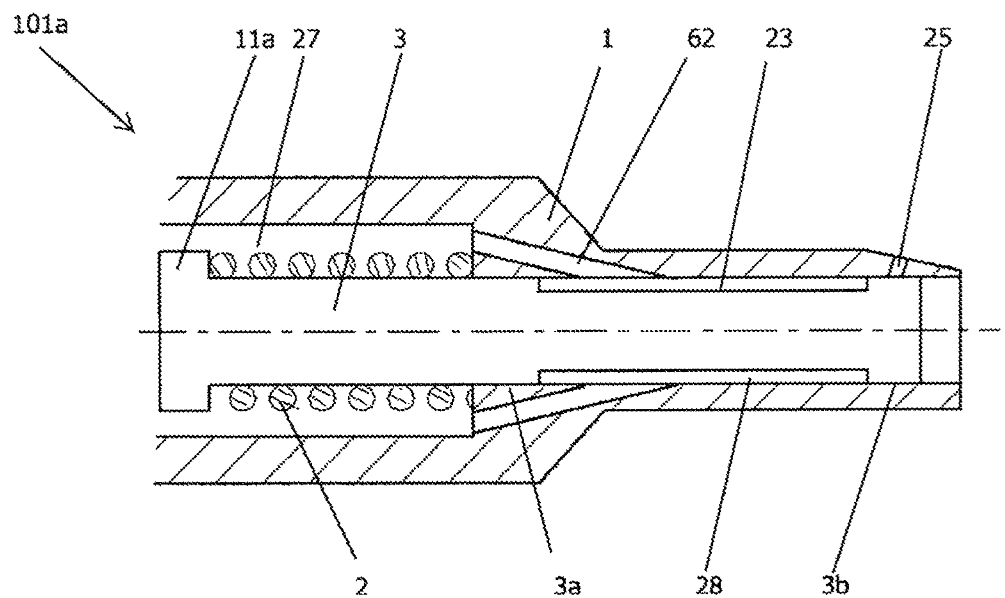
FIG. 3 illustrates an alternative embodiment of the injection nozzle where the lubricating oil is conducted to the turned recess via ducts in the nozzle rod.

FIG. 3 is a view corresponding to FIG. 2, though illustrating a second embodiment of an injection nozzle 101*a*. This embodiment differs from the one described above by a different design of the pressurised oil supply ducts 62. The pressurised lubricating oil is supplied to the annular chamber 28 from the pressure chamber 27 around the valve body 67 and the spring 2 via the pressurised oil supply ducts 62 formed as borings in the wall of the nozzle rod. The bevellings 20 in the valve body 3 can hereby be omitted. By this embodiment, the head 11*a* of the valve body 3 is cylindrical with flat end face for contact against the stop 4 (not shown in FIG. 3).

The other elements and functions will be as described for the injection nozzle shown in FIGS. 1 and 2.

Figure 4:
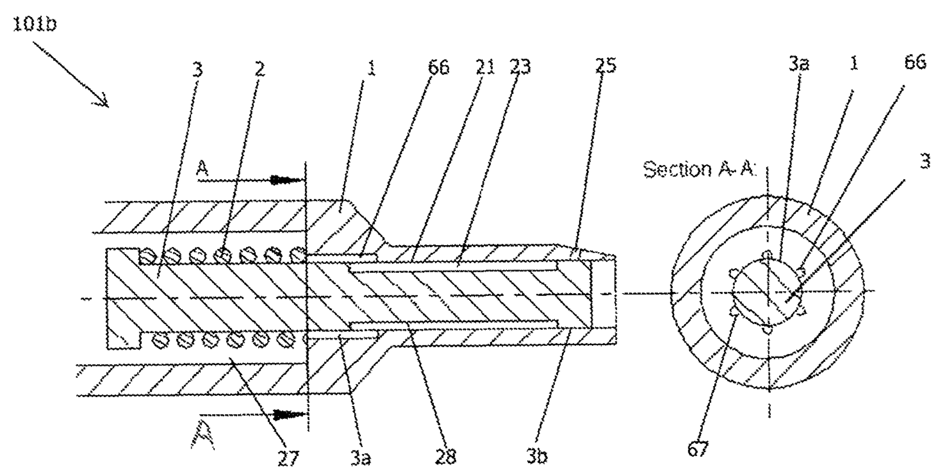
FIG. 4 illustrates an alternative embodiment of the injection nozzle where the lubricating oil is conducted to the turned recess via cutouts in the nozzle seat boring.

FIG. 4 is a view corresponding to FIG. 2, but illustrating a third embodiment of an injection nozzle 101*b*. This embodiment differs from the above description by a different design of the pressurised oil supply ducts 66 which are here formed by the nozzle rod 1 in the cylindrical valve seat boring 21 having at least one longitudinal groove 67, which together with the cylindrical sealing face 3*a* of the valve body form pressurised oil supply ducts 66 connecting the pressure chamber 27 with the annular chamber 28.

Figure 5:
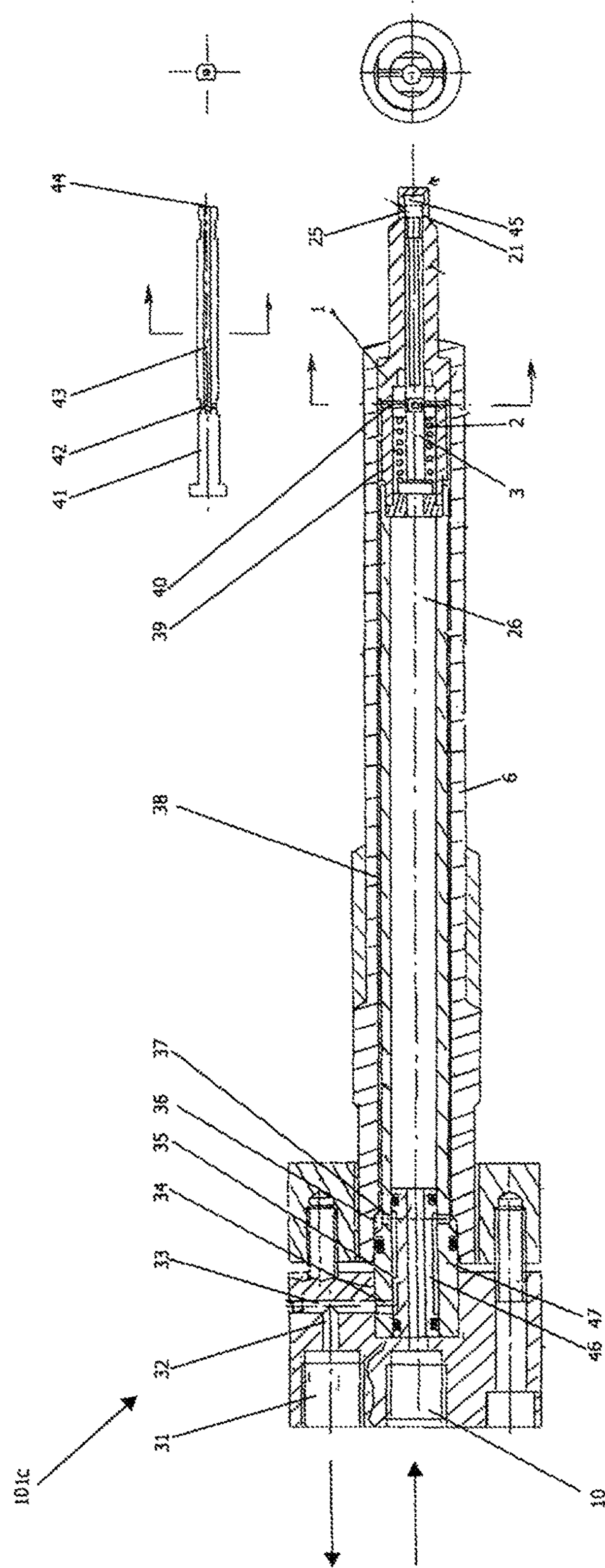
FIG. 5 illustrates a second embodiment of an injection nozzle where possible leak oil is returned to an oil reservoir.

FIG. 5 shows a fourth embodiment of an injection nozzle 101*c*. In this embodiment, a dose of pressurised lubricating oil is delivered through the union 10 and on into the duct 26 and the pressure chamber 27. The valve body 3 is pressed in direction towards the nozzle outlet when the force from the oil pressure is large enough to surmount the force from the spring 2. This part of the injection nozzle operates in the same way as the injection nozzle shown in FIGS. 1*a* and 1*b*.

The difference from the first embodiment is that this injection nozzle does not conduct possible leak oil from the sealing face 21 into the cylinder, but collects this leak oil in a cavity 45 formed in front of the valve body 3 as the cavity is closed at the end. The leak oil is conducted from the cavity 45 through the valve body 41 via the opening 44 and through the ducts 43 and 42. From here, the oil is conducted via one or more ducts 40 out through the side of the nozzle rod 1. Cavities/ducts 39 and 38 ensure that the leak oil can be conducted to the head of the injection nozzle. The oil is conducted from the duct 38 to a cavity 36 and through a passage 37 into a turned recess/cavity 35 around an inner separating element 46 (separating pressurised oil from leak oil). From this point the oil is conducted through a passage 34 in an outer separator element 47 to the discharge union 31 for leak oil via the ducts 33 and 32.

Figure 6:
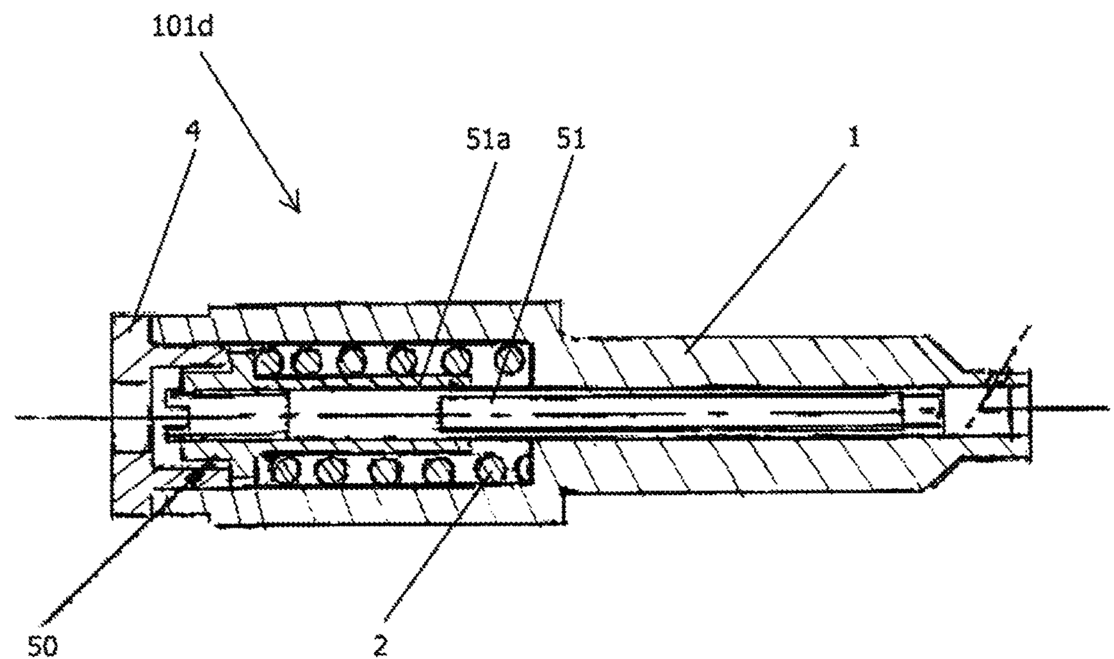
FIG. 6 shows a partial section through an injection nozzle with adjustable stop for the valve body.

FIG. 6 shows a fifth embodiment of the injection nozzle 101*d*. In this embodiment, the opening pressure for the injection nozzle is adjustable. The nozzle rod 1 and the stop 4 are designed according to the same principle as the corresponding elements in the embodiments with "fixed" and predefined opening pressure. But in this embodiment, the compression of the spring 2 can be adjusted steplessly in that the valve body 51 has a screw thread 51*a* at one end. An adjusting nut 50 can be screwed on this thread. The spring compression can hereby be changed by adjusting/rotating the adjusting nut 50. Hereby is achieved an embodiment enabling uniformity in the spring compression without need for applying very fine tolerances (under 5/100 mm) on the components involved. At the same time, this embodiment is also advantageous in that there is no need for the spring to meet very strict requirements.

Figure 7:
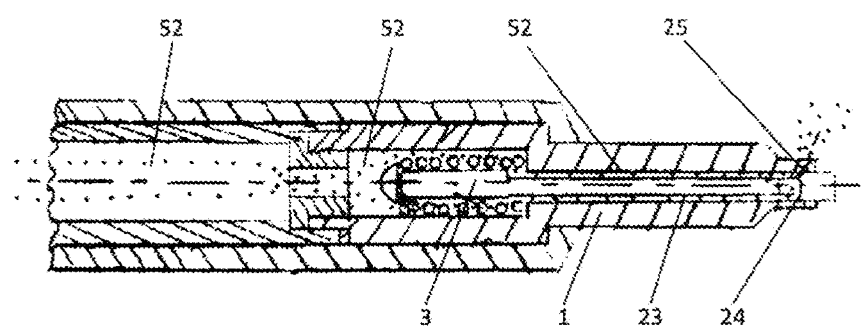
FIGS. 7-9 show schematic views of an injection nozzle.
Figure 8:
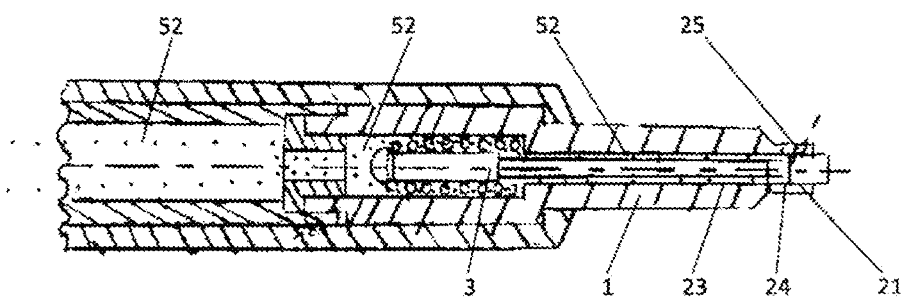
Figure 9:
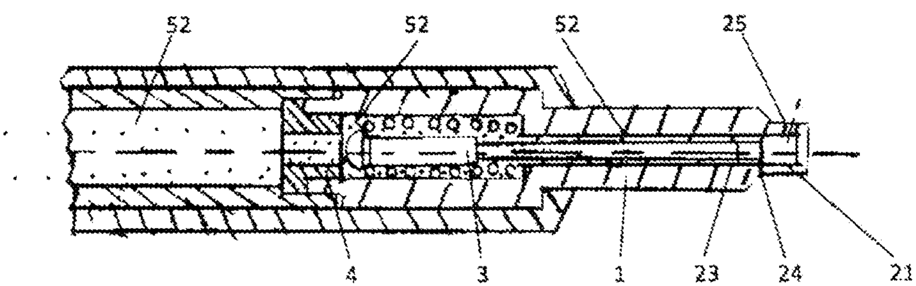

FIGS. 7, 8 and 9 show the most important operating positions of the injection nozzle.

FIG. 9 shows the injection nozzle with the lubricating oil 52 in unpressurised condition. The valve body 3 is disposed farthest from the nozzle outlet 25 under the action of the force from the spring 2. At this position, the sealing surface 23 is not in contact with the nozzle outlet 25. The valve body 3 rests on the stop 4 in this position.

FIG. 8 shows the injector with pressurised lubricating oil 52, but in rest position, in which it remains until the lubricating oil pressure amounts to a size that can surmount the spring force In this position, the front edge 24 of the turned recess 23 is disposed such that there is no passage between the nozzle outlet 25 and the annular chamber 28. The lubricating oil is still. However, a minor leak can occur across the sealing face 21.

FIG. 7 shows the injection nozzle with pressurised lubricating oil 52 where the pressure in the lubricating oil is at a level surmounting the spring force. In this position, pressurised lubricating oil flows from the annular chamber 28 out through the nozzle outlet 25. There is only a limited risk of leaking in this position since the oil will mostly pass through the nozzle outlet 25. From this point, the lubricating oil will be delivered either in atomised form or as a jet, depending on nozzle geometry, viscosity, flow conditions, pressure etc.

Figure 10:
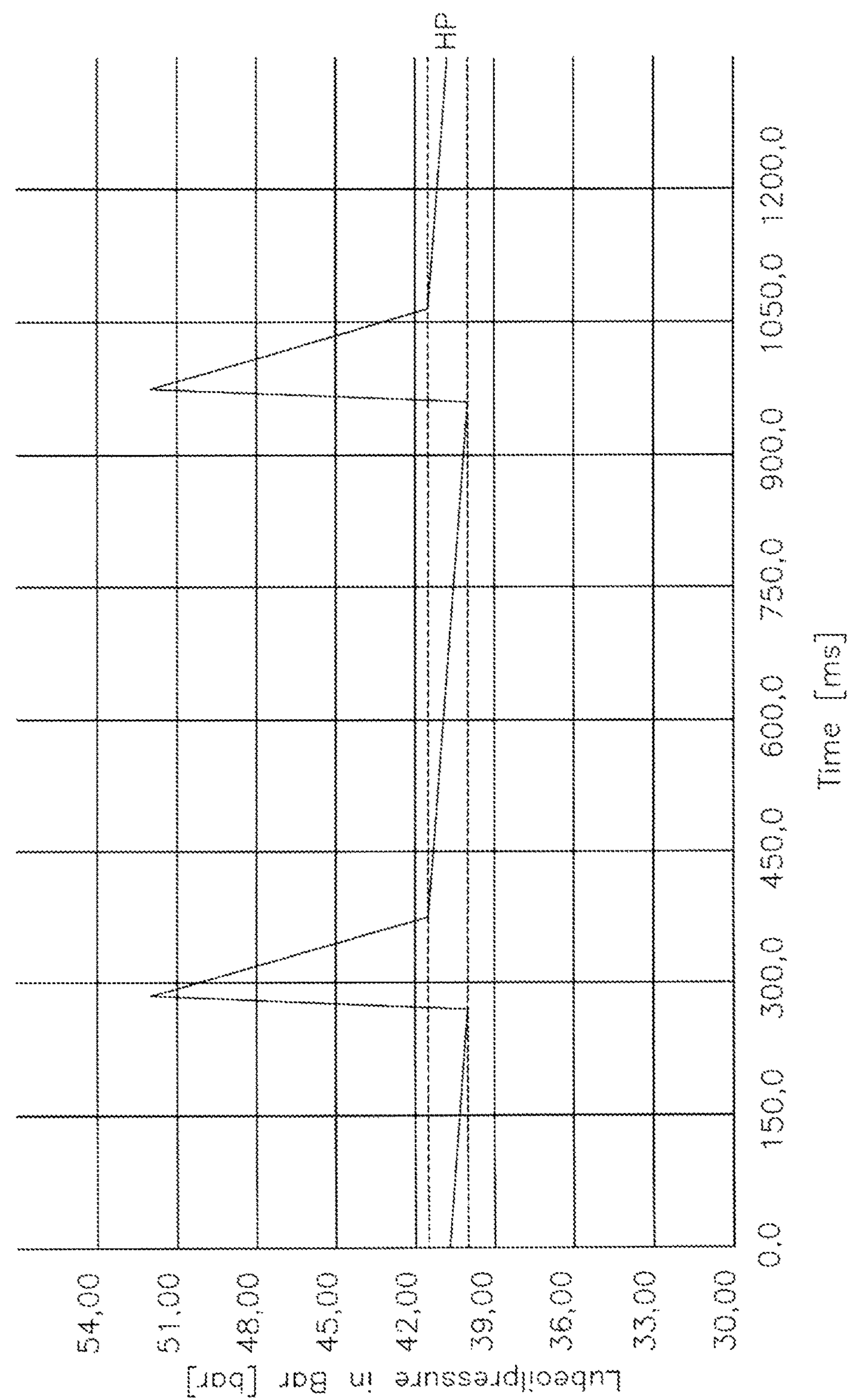
FIG. 10 shows a curve for illustrating pressure conditions in an injector.

FIG. 10 is a curve showing an example of how the lubricating oil pressure varies during an injection with an injection nozzle according to embodiments of the present invention. On the Figure there is an area HP called "holding pressure". This corresponds to the position of the injection nozzle in FIG. 8 where the oil is pressurised, but where no lubricating oil is delivered through the nozzle outlet 25. Here it can be seen that there is a certain leakage of lubricating oil until the dosing of a portion of pressurised lubricating oil when opening for delivery of pressurised lubricating oil through the nozzle outlet. Depending on the design of the injection nozzle, there may thus occur a small and marginal leaking of lubricating oil which may cause a loss of pressure between successive activations and consequently a pressure drop between the activations. This can be seen on the curve by the occurrence of a rise in pressure from about 40 bar to 52 bar. This part of the pressure curve corresponds to the position of the injection nozzle in FIG. 7 where pressurised lubricating oil is delivered directly through the nozzle outlet 25.

Figure 11:
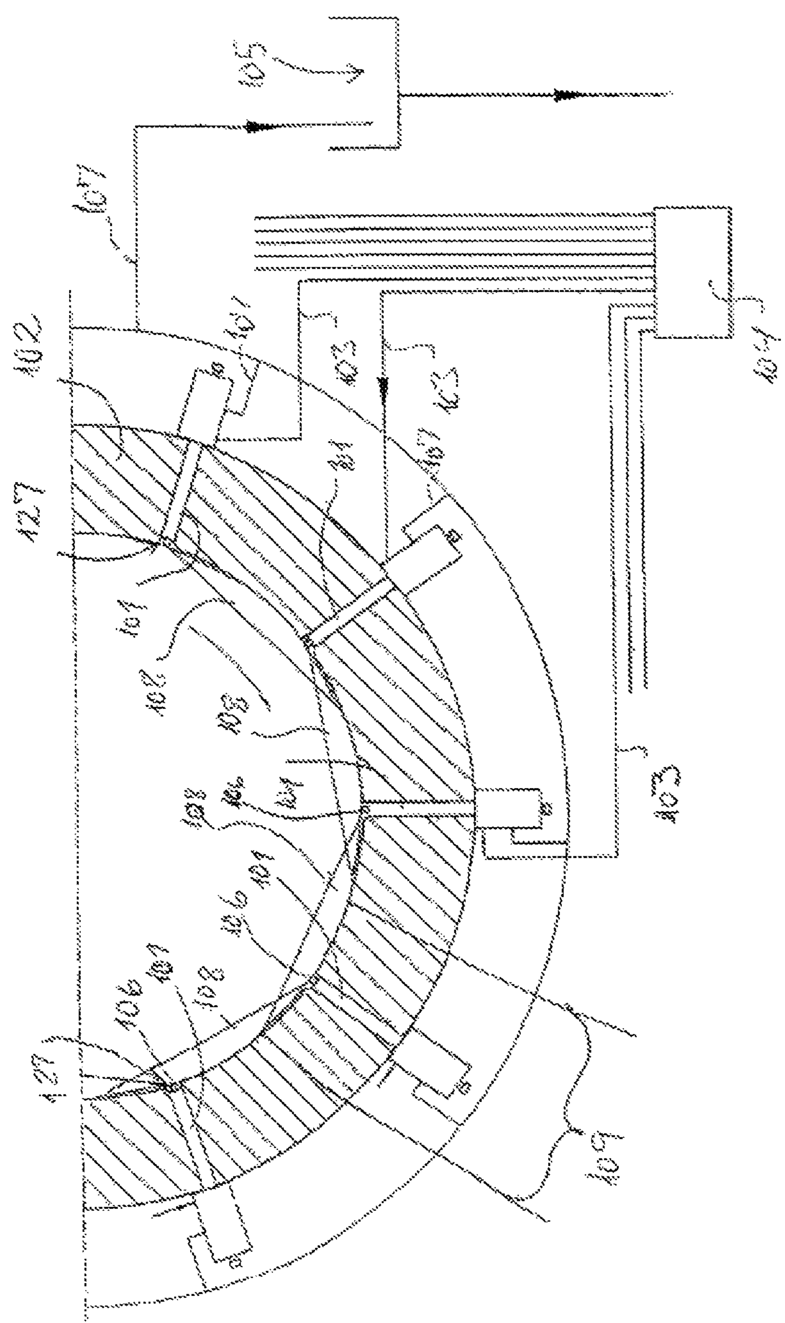
FIG. 11 shows a schematic view of a lubricating oil system in which is used injection nozzles coupled in parallel.

FIG. 11 shows a traditional system with a number of valves 101 coupled in parallel and located in a cylinder wall 102. The injection nozzles 101 are mounted in mounting holes 127 which are oriented radially in the cylinder wall in this embodiment.

The injection nozzles 101 are via hydraulic pipes or via flexible oil hoses 103 connected with a lubricating apparatus 104 which includes individual pump units for respective injection nozzles 101 and is connected with an oil tank 105.

At one end, each injection nozzle 101 has a nozzle outlet 106 disposed in the cylinder wall immediately within the inner surface of the cylinder wall 102. Through the nozzle outlet 106, the oil is atomised/jetted when the pressure in the oil pipe 103 reaches a predetermined level.

At the parts provided outside the cylinder wall 102, the injection nozzles are connected with hydraulic pipes or with flexible return hoses/pipes 107 for oil to be returned to the oil tank 105.

The injection nozzles are discharging an oil mist or injection jet 108 transversely to the valve stem, covering an area 109 of the cylinder wall against which the oil mist/oil delivery is directed.

As lubricating apparatus 104 various pumping apparatuses can be applied, possibly using conventional lubricating apparatuses powered by the chain drive of the motor or hydraulic lubricating apparatuses that are electrically controlled. The pump units of the lubricating apparatus are to dose and pressurise in a way such that the oil pressure surmounts the force from the spring incorporated in the injection nozzle.

In FIG. 11 is shown an embodiment where the injection nozzles 101 are supplied via each their oil pipe 103 by individual pump units in a lubricating apparatus 104. Such a lubricating apparatus 104 will have several pump units, each feeding one injection nozzle 101; in large engines there will typically be a system where injection nozzles in a cylinder is lubricated by one lubricating apparatus 104.

Figure 12:
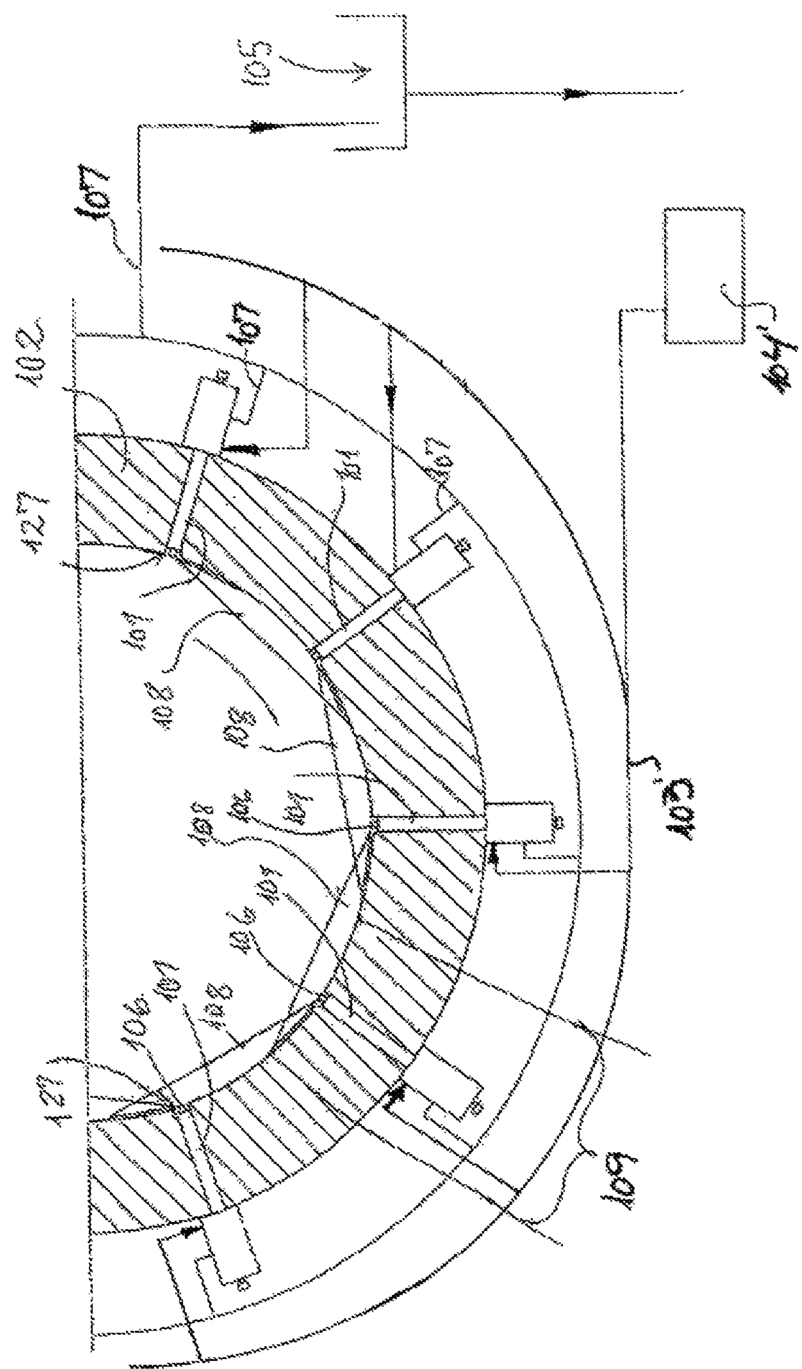
FIG. 12 is a view corresponding to FIG. 11, but illustrating a lubricating oil system with serially coupled injection nozzles.

FIG. 12 shows a lubricating oil system with a number of serially coupled injection nozzles 101 provided in a cylinder wall 102. By this system, the injection nozzles 101 are coupled in series and supplied by one pump unit in a lubricating apparatus 104' whereby piping is simplified appreciably. Thereby only one oil pipe 103' is used for supplying oil to the injection nozzles 101. Similar to the system shown in FIG. 11, the injection nozzles 101 are connected by hydraulic pipes or by flexible return hoses/pipes 107 for oil to be returned to the oil tank 105.

In this system it is required that the supply pressure is carefully set as identical for the coupled injection nozzles 101 since the supplied amounts otherwise can vary too much. Other conditions greatly influence the variation of the supplied portions (disposition of pipes, pipe length, etc.) as well, though the supply pressure is the most important condition.

The injection nozzles do not have any valve seat such as known from traditional injection nozzles, which can change in character over time due to the influence of wear/dirt/etc. These are parameters that will influence opening conditions for the valve of the injection nozzle. This means that an injection nozzle according to embodiments of the present invention will have more uniform, operationally reliable, robust and continuous (over time) injection portions.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An injection nozzle for use in injecting lubricating oil into cylinders in engines and adapted with a mounting means for fastening in a cylinder wall, with a nozzle rod extending through the cylinder wall and with at least one nozzle outlet at an inner end of the nozzle rod, the nozzle rod including a valve with a cylindrical valve seat bore in which is provided a displaceable valve body having a cylindrical sealing surface which interacts with the cylindrical valve seat bore of the nozzle rod, the displaceable valve body having an enlarged head at an outer end of the displaceable valve body with a contact face for a spring disposed around the displaceable valve body for establishing a spring-loaded closing of the valve, the nozzle rod including a passage for pressurised oil for supplying pressurised oil to a pressure chamber in which the pressurised oil can exert a force on the displaceable valve body so that the displaceable valve body is displaced against the action of the spring for opening the valve and establishing an overpressure injection of oil through the nozzle outlet until the oil pressure drops such that the spring establishes a closing of the valve, wherein the displaceable valve body is formed by a cylindrical rod which has a turned recess in the cylindrical sealing surface of the displaceable valve body, the turned recess being arranged at an inner end of the displaceable valve body, with parts of the cylindrical sealing face of the displaceable valve body at each side of the turned recess, for being connected with the nozzle outlet at a forward displacement of the displaceable valve body towards an outlet end of the injection nozzle, against the action of the spring, to deliver the pressurized oil to the nozzle outlet, the pressure chamber of the nozzle rod being formed by a pressure chamber bore with a greater diameter than the valve seat bore for forming a pressure chamber in which the spring is located, and the pressure chamber via a pressurised oil supply duct being connected with the turned recess in the displaceable valve body.

2. The injection nozzle according to claim 1, wherein the displaceable valve body has at least one bevelled side for forming the pressurised oil supply duct together with the valve seat bore.

3. The injection nozzle according to claim 1, wherein the nozzle rod has at least one bore connecting the pressure chamber with the turned recess.

4. The injection nozzle according to claim 1, wherein the nozzle rod in the cylindrical valve seat bore has at least one longitudinal groove connecting the pressure chamber with the turned recess.

5. The injection nozzle according to claim 1, wherein the nozzle rod also includes a return oil passage for draining off a leak oil.

6. The injection nozzle according to claim 1, wherein the valve seat bore is open at the end such that a leak oil can be drained off via the open end.

7. The injection nozzle according to claim 1, wherein the displaceable valve body has two opposing bevelled sides.

8. The injection nozzle according to claim 1, wherein the bevelled sides of the displaceable valve body extend into the pressure chamber of the valve in which the spring is located.

9. The injection nozzle according to claim 1, wherein the contact face of the displaceable valve body is planar or spherical.

10. The injection nozzle according to claim 1, wherein a stop is provided for limiting the displacement of the displaceable valve body.

11. The injection nozzle according to claim 1, wherein a nut is provided for preloading the spring.

12. The injection nozzle according to claim 1, wherein a plurality of nozzle outlets are provided, disposed with varying orientations relative to a center axis through the nozzle rod.

13. A method comprising:

utilizing an injection nozzle according to claim 1 in a system for use in injecting lubricating oil into cylinders in engines, arranged with injection nozzles, which are mounted in a cylinder wall, a lubricating apparatus with at least one pumping unit, connecting tubes for connecting the lubricating apparatus with the injection nozzles, wherein the injection nozzles are coupled in series and supplied with lubricating oil from a pump unit.

* * * * *